United States Patent [19]

Nagel

[11] 4,080,529
[45] Mar. 21, 1978

[54] COMBINATION CLEARANCE AND SIDE MARKER LENS

[75] Inventor: Robert I. Nagel, Skokie, Ill.

[73] Assignee: Dominion Auto Accessories Limited, Toronto, Canada

[21] Appl. No.: 706,745

[22] Filed: Jul. 19, 1976

[51] Int. Cl.² ............................................... B60Q 1/32
[52] U.S. Cl. ...................................... 362/235; 362/339
[58] Field of Search ................... 240/8.2, 8.22, 8.3, 240/7.1 R, 106.1; 340/87, 89

[56] References Cited

U.S. PATENT DOCUMENTS

| | | | |
|---|---|---|---|
| 2,184,208 | 12/1939 | Brown et al. | 240/8.2 |
| 2,343,598 | 3/1944 | Wagner | 240/8.2 X |
| 3,184,590 | 5/1965 | Nagel | 240/8.2 X |
| 3,222,512 | 12/1965 | Dickson | 240/8.2 |
| 3,831,018 | 8/1974 | Weber | 240/8.2 |

Primary Examiner—Richard L. Moses
Attorney, Agent, or Firm—Barnes, Kisselle, Raisch & Choate

[57] ABSTRACT

A combination clearance and side marker lamp comprising a generally rectangular housing having a base wall and a peripheral wall surrounding the base wall and having side portions and end portions. Longitudinally spaced light bulbs are mounted within the housing and have at least a portion thereof including the filament below the upper edges of the side and end wall portions of the peripheral wall of the housing. A lens of transparent material is mounted on the housing and has a top wall and peripheral side and end walls. The lens has longitudinally spaced sets of arcuate ribs on the internal surface thereof. The top wall of the lens has a prism at each end thereof adjacent the area of juncture with the end wall constructed and arranged to direct light through said end wall. Each end wall of the lens has an upwardly and inwardly inclined surface portion on the exterior surface thereof extending from an area spaced from the lower free edge thereof toward the area of juncture of the end wall with the top wall to direct the light longitudinally of the lamp.

22 Claims, 17 Drawing Figures

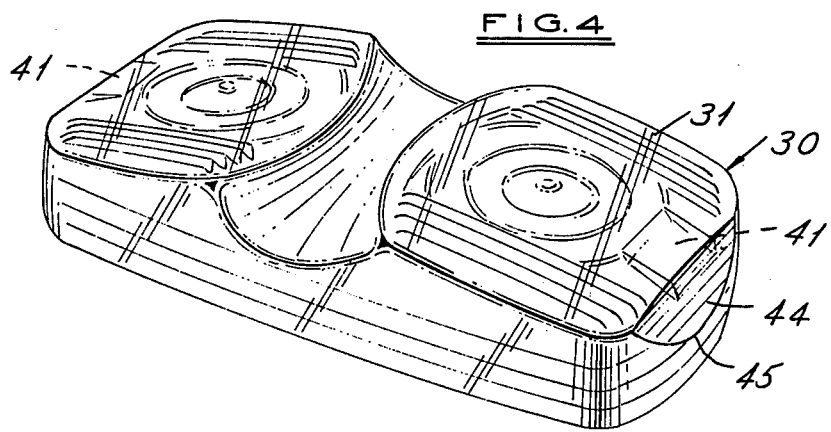
FIG. 4
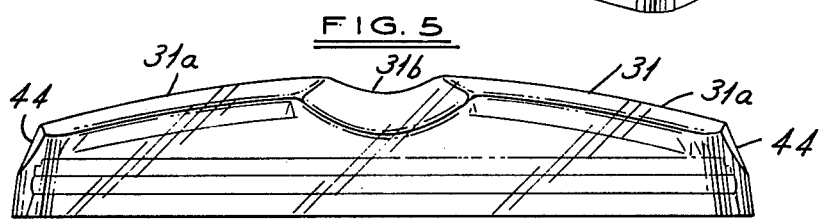
FIG. 5
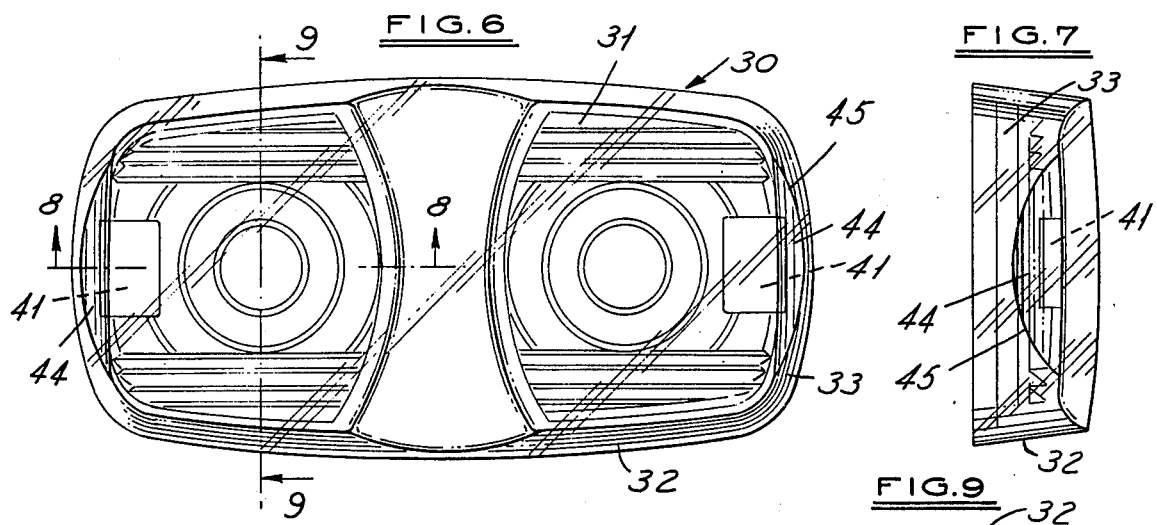
FIG. 6
FIG. 7
FIG. 8
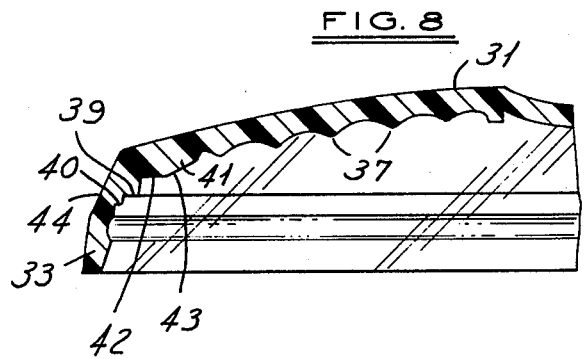
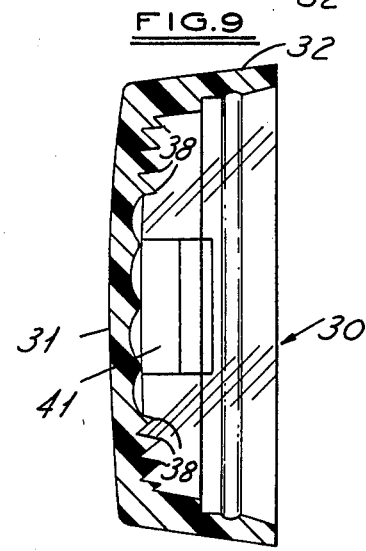
FIG. 9

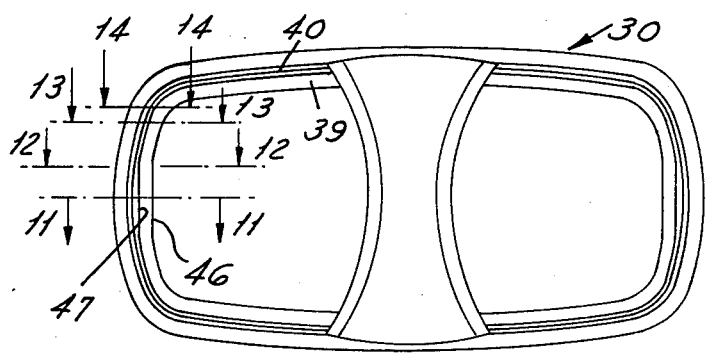
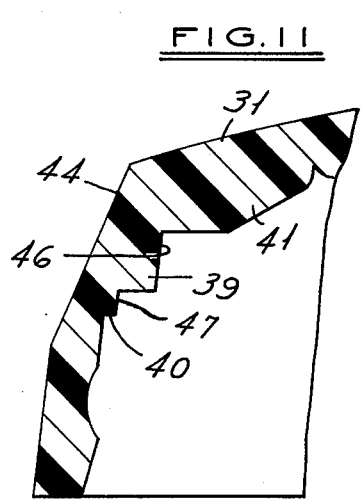
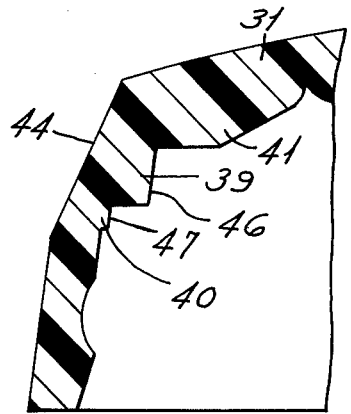
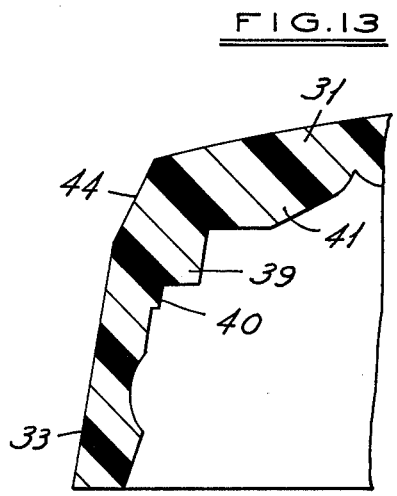
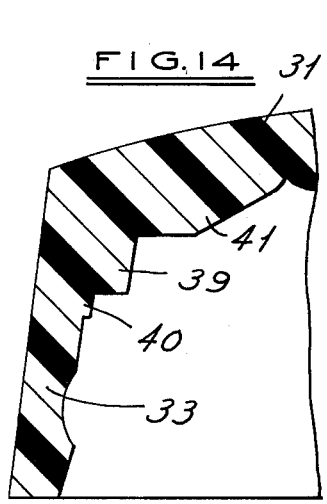
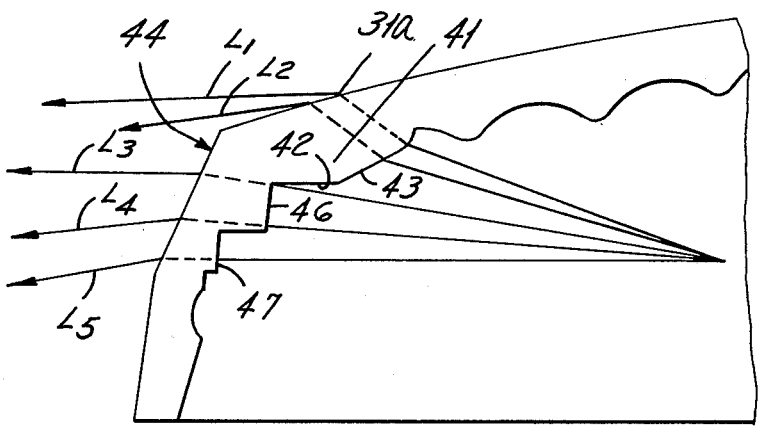

COMBINATION CLEARANCE AND SIDE MARKER LENS

This invention relates to combination clearance and side marker lamps and particularly to a side marker lamp which can be utilized as both a clearance and side marker lamp.

BACKGROUND OF THE INVENTION

In vehicles, it has been common to utilize side marker lamps which are mounted on the vehicle along the sides of the vehicle near the front and rear edges to indicate the overall length of the vehicle as well as along intermediate locations on the sides of the vehicle. It has also been common to utilize clearance lamps at the front or rear of a vehicle near the upper left and right extreme edges to indicate the overall width and height of the vehicle.

In one type of side marker lamp that has been conventionally used, the lamp comprises a housing in which a pair of bulbs is mounted and a lens overlying the housing. In such a lamp, the housing includes a peripheral wall having end portions that normally prevent illumination longitudinally so that the side marker lamp cannot be utilized at the corners of the vehicle as a clearance lamp and side marker lamp.

Among the objects of the invention are to provide a combination clearance and side marker lamp that can be utilized at the front and rear of the vehicle to delineate the overall width, height and length of the vehicle and can also be used as a side marker lamp on the side of the vehicle.

SUMMARY OF THE INVENTION

In accordance with the invention, a side marker lamp of the aforementioned construction has the top wall of the lens formed with a prism on the inner surface at each end thereof adjacent the area of juncture with the respective end wall constructed and arranged to direct light through the end wall and each end wall of the lens has an upwardly and inwardly inclined surface portion on the exterior surface thereof extending from an area spaced from the lower free edge thereof toward the area of juncture of the end wall with the top wall to direct the light longitudinally of the lamp.

DESCRIPTION OF THE DRAWINGS

FIG. 4 is a perspective view of the lens utilized in the lamp embodying the invention.

FIG. 5 is a side elevational view of the lens.

FIG. 6 is a top plan view of the lens.

FIG. 7 is an end view of the lens.

FIG. 8 is a fragmentary sectional view on an enlarged scale taken along the line 8—8 in FIG. 6.

FIG. 9 is a sectional view taken along the line 9—9 in FIG. 6.

FIG. 10 is a bottom plan view of the lens.

FIG. 11 is a sectional view on an enlarged scale taken along the line 11—11 in FIG. 10.

FIG. 12 is a fragmentary sectional view taken along the line 12—12 in FIG. 10.

FIG. 13 is a fragmentary sectional view taken along the line 13—13 in FIG. 10.

FIG. 14 is a fragmentary sectional view on an enlarged scale taken along the line 14—14 in FIG. 10.

FIG. 15 is a diagrammatic ray diagram showing the path of typical light rays through a portion of the lens.

DESCRIPTION

Figure 1:
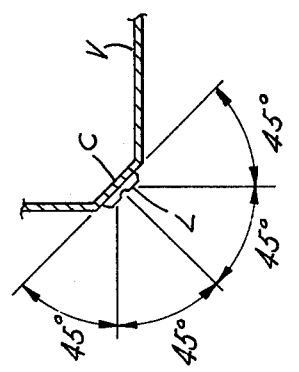
FIG. 1 is a diagrammatic view showing the manner in which a clearance and side marker lamp embodying the invention is utilized on a vehicle to perform the functions of indicating both clearance and the sides of the vehicle.

Referring to FIG. 1, the invention is directed to a combined clearance and marker lamp L that can be mounted at the corners C of a vehicle V at an angle of 45° to the longitudinal and transverse axes of the vehicle near the upper left and right extreme edges to indicate the overall width, height and length of the vehicle.

Figure 2:
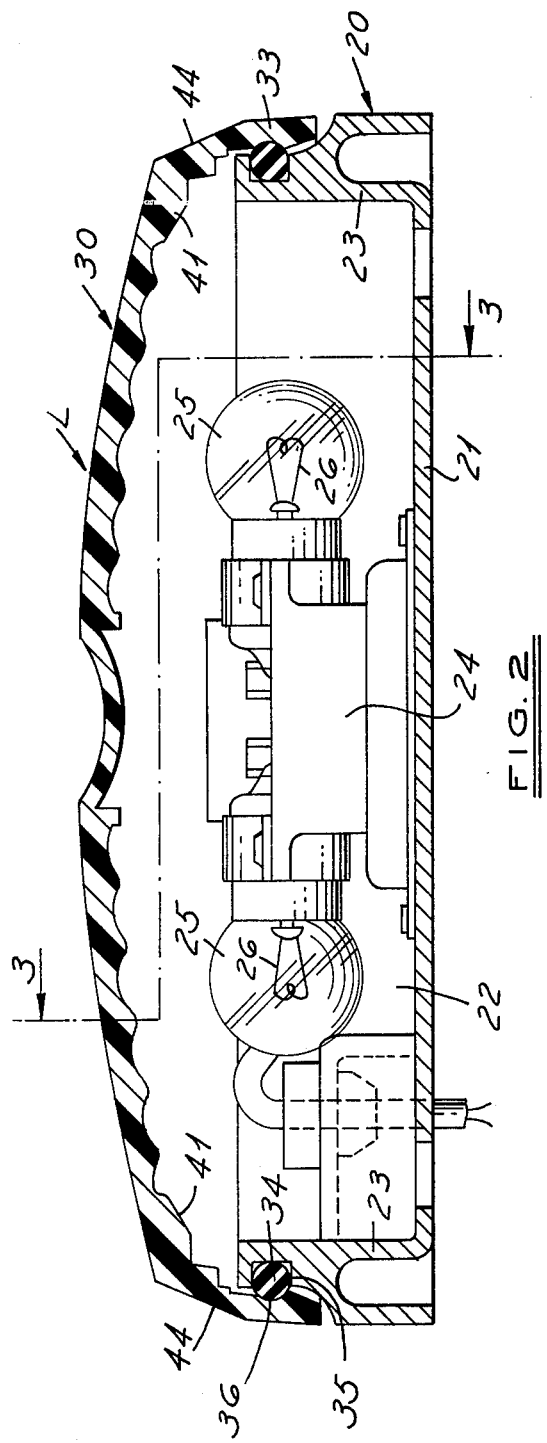
FIG. 2 is a longitudinal sectional view through a combined clearance and side marker lamp embodying the invention.
Figure 3:
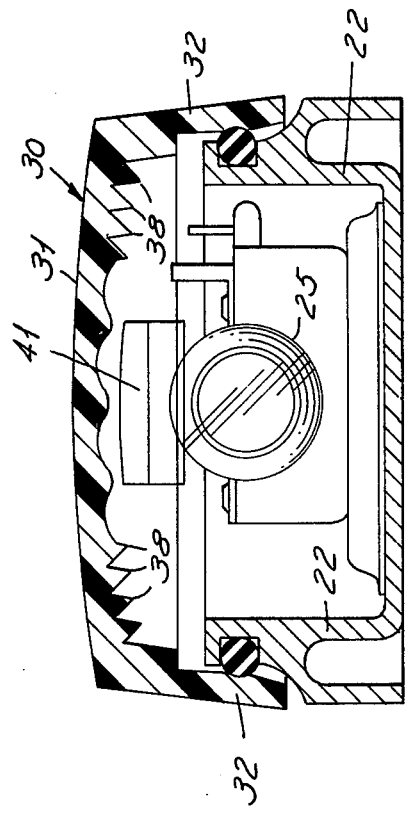
FIG. 3 is a sectional view taken along the line 3—3 in FIG. 2.

Referring to FIGS. 2 and 3, the lamp L comprises a housing 20 that includes a base wall 21, preferably made of metal, and a peripheral wall having side wall portions 22 and end wall portions 23. A support 24 on the base wall 21 supports bulbs 25 at longitudinally spaced areas within the base, the filaments 26 of the bulbs 25 being below the plane defined by the upper edges of the side wall portions 22 and end wall portions 23.

A lens 30 of transparent material such as plastic is provided on the housing and includes a top wall 31, side walls 32 and end walls 33. As shown in FIGS. 2 and 3, lens 30 is held in position by frictional engagement with an O-ring 34 that is positioned in a groove 35 in the peripheral wall of the housing and engages an arcuate groove 36 in the side and end walls 32, 33 of the lens 30 which surround the peripheral wall of the base.

As shown in FIGS. 4–6, the top wall 31 of the lens 30 has upwardly and inwardly inclined convex portions 31a extending upwardly and inwardly toward a central concave portion 31b with exterior surfaces of the portions 31a, 31b being smooth. Each side wall 32 is generally straight in vertical cross section (FIG. 9) and slightly convex in horizontal cross section (FIG. 6). Each end wall has a smooth outer surface which is convex in horizontal view as shown in FIG. 6.

As further shown in FIGS. 4–9, the inner surface of top wall 31 is formed with two sets of annular ribs 37 spaced longitudinally of one another generally overlying bulbs 25, each rib 37 comprising a curved apex connected by a concave valley. The inner surface of top wall 31 further includes two sets of longitudinally extending parallel prisms 38 which are V-shaped and assymetrical and extend along the longitudinal edges of the spaced portions 31a of the top wall 31. In addition, the lens 30 includes spaced annular shoulders 39, 40 on the side and end walls thereof below the area of juncture of the side and end walls with the top wall.

In accordance with the invention, the lens is designed and constructed in order to provide light throughout a 180° arc as viewed in FIG. 1, even though the filaments 26 are below the plane of the top edges through a 180° arc as viewed in FIG. 1, even though the filaments 26 are below the plane of the top edges of the side and end wall portions 22, 23 of the housing 20.

In accordance with the invention, a prism 41 is provided at the ends of the top wall 31 adjacent the area of juncture of the top wall 31 with the end walls 32 centrally located transversely of the lens 30 and spaced from the side walls 33. Each prism 41 is generally rectangular and includes a horizontal flat surface 42 and inclined flat surface 43 providing an obtuse angle therebetween. In addition, the end walls 33 have an inclined surface 44 which extends upwardly and inwardly at an angle to the vertical which is greater than the normal inclination of the end wall 33. The surface 44 merges with the remaining surface of the end wall 33 along an arc 45. The surface 44 thus is generally straight in vertical cross section and arcuate in horizontal cross section (FIGS. 8, 4). Surface 44 is wider than prism 41.

Further, in accordance with the invention, the shoulders 39, 40 are provided with flat surfaces 46, 47 at the vertical portions thereof which cooperate with the convex or arcuate inclined surface 44 to prevent a negative lens effect upon the light emanating from the bulbs 25 and thereby prevent the light from diverging.

When the lamp embodying the invention is illuminated, that is, when the bulbs 25 are energized, it has been found that the lamp functions to provide adequate light throughout the 180° range necessary for use as a combined clearance and marker lamp such as shown diagrammatically in FIG. 1. The lamp meets the standards set by the appropriate agencies or lighting committees for vehicles.

It has been found that the angle which the center of the surface 44 makes with a vertical plane extending longitudinally of said lamp, as viewed in FIG. 8, preferably should be about $24\frac{1}{2}°$.

Figure 16:
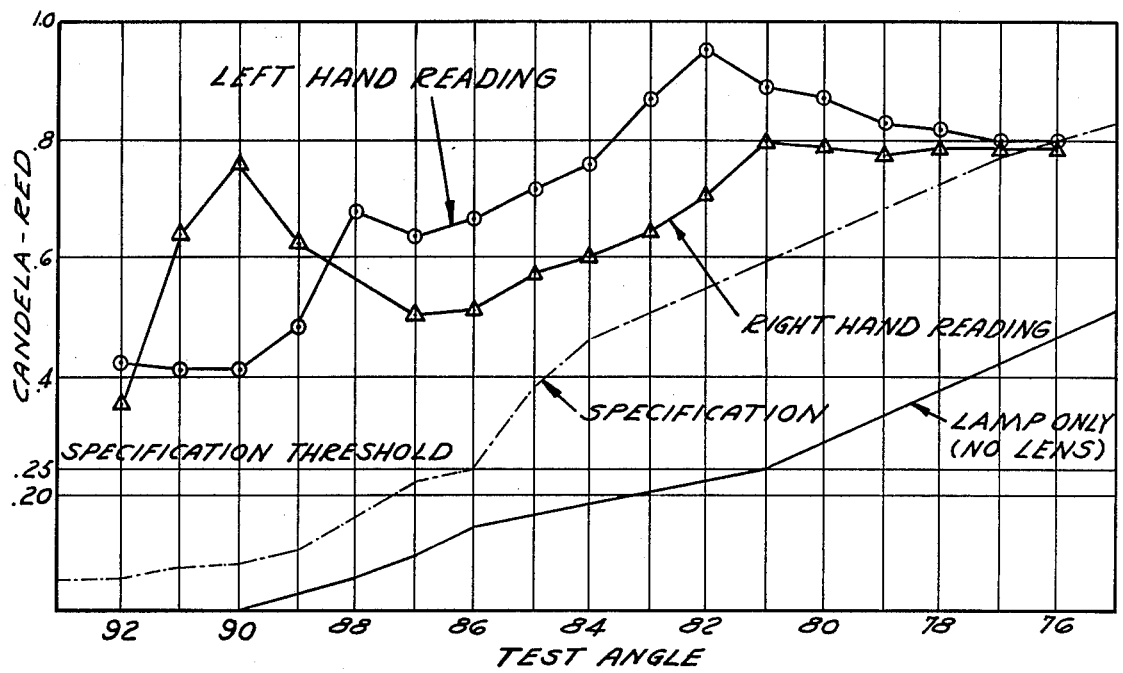
FIGS. 16 and 17 are curves showing the light intensity at various angles to the lens.
Figure 17:
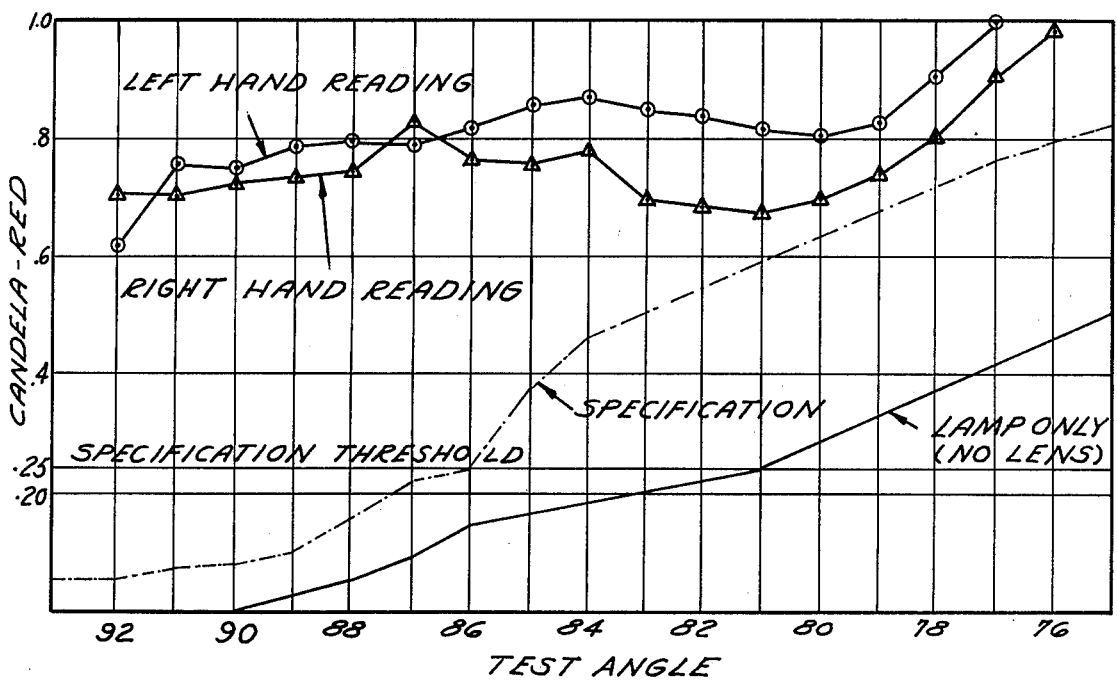

The tests on lenses made in production upon illumination at various angles are shown in the curves shown in FIGS. 16 and 17. It can be seen that the lamp embodying the invention provides illumination throughout 180°, that is, 90° from each side of the centerline of the lamp and produces such illumination which is not possible from a lamp which does not embody the invention, that is, does not include the surfaces 44, 46, 47.

The manner in which the prism 41 and surface 44 function to direct the light longitudinally is shown in ray diagram FIG. 15. Specifically, surfaces 43, 31a coact to refract typical light rays $L_1$, $L_2$ toward the horizontal; surfaces 46, 44 coact to refract typical rays $L_3$, $L_4$ and surfaces 47, 44 coact to refract typical light rays $L_5$.

The lamp embodying the invention has been found to produce results such as summarized in the curves of FIGS. 16 and 17 wherein it can be seen that in the area approaching 90° to a perpendicular to the base of the lamp, the lamp embodying the invention produces sufficient lateral direction of light at the angles approaching 90° as to meet the standards as contrasted to a lamp shown in broken lines without the prisms or as a lamp without a lens as shown in solid lines.

I claim:

1. A combination clearance and side marker lamp comprising
    a generally rectangular housing comprising a base wall and a peripheral wall surrounding the base wall and having side portions and end portions,
    longitudinally spaced bulbs mounted within the housing and having at least a portion thereof including the filament below the upper edges of the side and end wall portions of the peripheral wall of the housing,
    a lens having a top wall and peripheral side and end walls,
    said lens having longitudinally spaced sets of annular ribs on the internal surface of the top wall thereof,
    each said end wall having an upwardly and inwardly inclined surface portion on the exterior surface thereof extending from an area spaced from the lower free edge thereof toward the area of juncture of said end wall with said top wall to direct light longitudinally of said lamp,
    said top wall having a prism at each end thereof adjacent the area of juncture with the respective end wall constructed and arranged to direct light through said end wall,
    said prism being centrally located transversely with respect to said side walls of said lens and spaced from said side walls.

2. The combination set forth in claim 1 wherein said upwardly and inwardly inclined surface on the exterior surface of each said end wall has a greater dimension transversely than the width of the prism.

3. The combination set forth in claim 2 wherein said lens includes a shoulder extending around the entire periphery of the inner surfaces of said side walls and end walls adjacent the area of juncture.

4. The combination set forth in claim 3 wherein said shoulder includes a flat vertical surface at the area of said prism and said upwardly and inwardly inclined surface on said end wall.

5. The combination set forth in claim 4 wherein said lens has a second annular shoulder extending around the periphery of said lens at said side walls and end walls below said first shoulder.

6. The combination set forth in claim 5 wherein said second shoulder has a flat vertical portion adjacent the central portion of the side wall.

7. The combination set forth in claim 6 including longitudinally extending ribs on the inner surface of said top wall adjacent each set of arcuate ribs.

8. The combination set forth in claim 7 wherein said arcuate ribs comprise arcuate apices connected by concave valleys.

9. The combination set forth in claim 8 wherein said longitudinally spaced ribs are V-shaped and assymetrical.

10. The combination set forth in claim 1 wherein the center of said upwardly and inwardly inclined surface on said end wall forms an angle of about $24\frac{1}{2}°$ with a transversely extending plane extending vertically with respect to the base of the housing.

11. A lens for a combination clearance and side marker lamp comprising
    a lens body of transparent material having a top wall and peripheral side and end walls,
    said lens having longitudinally spaced sets of annular ribs on the internal surface of the top wall thereof,
    each said end wall having an upwardly and inwardly inclined surface portion on the exterior surface thereof extending from an area spaced from the lower free edge thereof toward the area of juncture of said end wall with said top wall to direct light longitudinally of said lens,
    said top wall having a prism at each end thereof adjacent the area of juncture with the respective end wall constructed and arranged to direct light through said end wall,
    said prism being centrally located transversely with respect to said side walls of said lens and spaced from said side walls.

12. The combination set forth in claim 11 wherein said upwardly and inwardly inclined surface on the exterior surface of each said end wall has a greater dimension transversely than the width of the prism.

13. The combination set forth in claim 12 wherein said lens includes a shoulder extending around the entire periphery of the inner surfaces of said side walls and end walls adjacent the area of juncture.

14. The combination set forth in claim 13 wherein said shoulder includes a flat vertical surface at the area of said prism and said upwardly and inwardly inclined surface on said end wall.

15. The combination set forth in claim 14 wherein said lens has a second annular shoulder extending around the periphery of said lens at said side walls and end walls below said first shoulder.

16. The combination set forth in claim 15 wherein said second shoulder has a flat portion adjacent the central portion of the side wall.

17. The combination set forth in claim 16 including longitudinally extending ribs on the inner surface of said top wall adjacent each set of arcuate ribs.

18. The combination set forth in claim 17 wherein said arcuate ribs comprise arcuate apices connected by concave valleys.

19. The combination set forth in claim 18 wherein said longitudinally spaced ribs are V-shaped and assymetrical.

20. The combination set forth in claim 19 wherein each said flat surface on said end wall forms an angle of about 24½° with a plane extending vertically with respect to the base of the housing.

21. A combination clearance and side marker lamp comprising a generally rectangular housing comprising a base wall and a peripheral wall surrounding the base wall and having side portions and end portions, longitudinally spaced bulbs mounted within the housing and having at least a portion thereof including the filament below the upper edges of the side and end wall portions of the peripheral wall of the housing, a lens having a top wall and peripheral side and end walls, each said end wall having an upwardly and inwardly inclined surface portion on the exterior surface thereof extending from an area spaced from the lower free edge thereof toward the area of juncture of said end wall with said top wall to direct light longitudinally of said lamp, said top wall having a prism at each end thereof adjacent the area of juncture with the respective end wall constructed and arranged to direct light through said end wall, said prism being centrally located transversely with respect to said side walls of said lens and spaced from said side walls.

22. A lens for a combination clearance and side marker lamp comprising a lens body of transparent material having a top wall and peripheral side and end walls, each said end wall having an upwardly and inwardly inclined surface portion on the exterior surface thereof extending from an area spaced from the lower free edge thereof toward the area of juncture of said end wall with said top wall to direct light longitudinally of said lens, said top wall having a prism at each end thereof adjacent the area of juncture with the respective end wall constructed and arranged to direct light through said end wall, said prism being centrally located transversely with respect to said side walls of said lens and spaced from said side walls.

* * * * *